(12) United States Patent
Kubota et al.

(10) Patent No.: US 8,567,543 B2
(45) Date of Patent: Oct. 29, 2013

(54) HYBRID VEHICLE

(75) Inventors: Shinya Kubota, Wako (JP); Harumi Takedomi, Wako (JP); Kazuyuki Kumakura, Wako (JP); Mitsushige Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 310 days.

(21) Appl. No.: 12/865,345

(22) PCT Filed: Jan. 23, 2009

(86) PCT No.: PCT/JP2009/051098
§ 371 (c)(1),
(2), (4) Date: Jul. 29, 2010

(87) PCT Pub. No.: WO2009/098952
PCT Pub. Date: Aug. 13, 2009

(65) Prior Publication Data
US 2011/0011654 A1 Jan. 20, 2011

(30) Foreign Application Priority Data
Feb. 7, 2008 (JP) .................................. 2008-028097

(51) Int. Cl.
*B60R 16/04* (2006.01)
(52) U.S. Cl.
USPC ...................................... 180/68.5; 180/65.21
(58) Field of Classification Search
USPC ......... 180/834, 299, 68.5, 68.1, 65.225, 65.1, 180/65.21, 65.28; 296/187.11, 203.04
See application file for complete search history.

(56) References Cited

U.S. PATENT DOCUMENTS

| 4,676,517 A | * | 6/1987 | Tamura .......................... 280/834 |
| 4,793,839 A |   | 12/1988 | Hayashida et al. |
| 5,111,900 A |   | 5/1992 | Leitermann |
| 5,392,873 A | * | 2/1995 | Masuyama et al. .......... 180/68.5 |

(Continued)

FOREIGN PATENT DOCUMENTS

| JP | 9-118252 A | 5/1997 |
| JP | 11-1184 A | 1/1999 |

(Continued)

OTHER PUBLICATIONS

Taiwanese Search Report dated Jan. 1, 2012, issued in corresponding application No. 098101264.

*Primary Examiner* — Hau Phan
(74) *Attorney, Agent, or Firm* — Arent Fox LLP

(57) ABSTRACT

A hybrid vehicle is provided in which a case (14) for housing an electrical component including at least a battery module is disposed underneath a floor of a luggage compartment interposed between left and right rear side frames (12) immediately to the rear of a fuel tank (42) disposed beneath a floor panel (41) of a hybrid vehicle, and a canister (48) is disposed on one of left and right sides of the case (14). Since the canister (48) is disposed further inside than the outer end of the rear side frame (12) in the left-and-right direction and further forward than the rear end of the case (14), when the vehicle is involved in a collision from the side the case (14) and the canister (48) can be protected by the rear side frame (12), and when the vehicle is involved in a collision from the rear the fuel tank (42) and the canister (48) can be protected by the case (14) while guaranteeing the capacity of a luggage compartment of a rear part of a vehicle body.

16 Claims, 10 Drawing Sheets

(56) References Cited

U.S. PATENT DOCUMENTS

| | | | |
|---|---|---|---|
| 5,702,125 A * | 12/1997 | Nakajima et al. | 280/834 |
| 6,662,891 B2 * | 12/2003 | Misu et al. | 180/68.1 |
| 7,004,274 B2 * | 2/2006 | Shibasawa et al. | 180/68.5 |
| 7,025,159 B2 * | 4/2006 | Smith et al. | 180/68.1 |
| 7,396,075 B2 * | 7/2008 | Ohkuma et al. | 297/180.1 |
| 7,556,113 B2 * | 7/2009 | Amori et al. | 180/68.5 |
| 7,568,755 B2 * | 8/2009 | Imada et al. | 296/187.11 |
| 7,607,501 B2 * | 10/2009 | Smith et al. | 180/68.1 |
| 7,614,473 B2 * | 11/2009 | Ono et al. | 180/299 |
| 7,654,351 B2 * | 2/2010 | Koike et al. | 180/68.5 |
| 7,905,307 B2 * | 3/2011 | Kubota et al. | 180/68.1 |
| 7,975,675 B2 * | 7/2011 | Menke | 123/519 |
| 2005/0028542 A1 * | 2/2005 | Yoshida et al. | 62/186 |
| 2005/0098373 A1 | 5/2005 | Horii | |
| 2009/0315359 A1 * | 12/2009 | Suzuki et al. | 180/65.225 |
| 2010/0025131 A1 * | 2/2010 | Gloceri et al. | 180/65.28 |
| 2010/0099019 A1 * | 4/2010 | Nagata et al. | 429/120 |

FOREIGN PATENT DOCUMENTS

| | | |
|---|---|---|
| JP | 2001-253254 A | 9/2001 |
| JP | 2004-262412 A | 9/2004 |
| JP | 2005-93299 A | 4/2005 |
| JP | 2005-205953 A | 8/2005 |
| JP | 2005-291032 A | 10/2005 |
| TW | 200505725 A | 2/2005 |
| WO | WO 89/08034 A1 | 9/1989 |

* cited by examiner

HYBRID VEHICLE

CROSS-REFERENCED TO RELATED APPLICATION

This application is a National Stage entry of International Application No. PCT/JP2009/051098, filed Jan. 23, 2009, which claims priority to Japanese Patent Application No. 2008-028097, filed Feb. 7, 2008, the duty of disclosure of the prior application is incorporated in its entirety by reference.

TECHNICAL FIELD

The present invention relates to a hybrid vehicle in which a case for housing an electrical component including at least a battery module is disposed underneath a floor of a luggage compartment interposed between left and right rear side frames immediately to the rear of a fuel tank disposed beneath a floor panel, and a canister is disposed on one of left and right sides of the case.

BACKGROUND ART

An arrangement in which a battery for driving a motor of a hybrid vehicle is disposed above a floor of a luggage compartment of a rear part of a vehicle body is known from Patent Publication 1 below.

Furthermore, with regard to a hybrid vehicle in which a battery is disposed in a luggage compartment behind a rear seat, and a spare tire is disposed to the rear of the battery, in order to prevent the battery from being damaged when there is a collision from the rear and the spare tire moves forward, an arrangement in which a guide member is provided for guiding the forward-moving spare tire obliquely upward is known from Patent Publication 2 below.

Patent Publication 1: Japanese Patent Application Laid-open No. 2005-205953

Patent Publication 2: Japanese Patent Application Laid-open No. 2004-262412

DISCLOSURE OF INVENTION

Problems to be Solved by the Invention

When a fuel tank is disposed beneath a rear seat of a hybrid vehicle and a spare tire and a battery are disposed underneath a floor of a luggage compartment of a rear part of a vehicle body in order to guarantee the capacity of the luggage compartment, there is a possibility that due to a collision of the vehicle, the battery, the fuel tank, a canister, which is a fuel tank accessory, etc. will be damaged, and it is therefore necessary to protect these components from the impact of the collision. Furthermore, when the vehicle is involved in a collision from the rear, even if the spare tire moves forward as a result of the impact of the collision, it is desirable that the fuel tank in front is protected from damage without providing a special guide member for guiding the spare tire.

The present invention has been accomplished in the light of the above-mentioned circumstances, and it is an object thereof to protect a case for housing an electrical component, a fuel tank, and a canister from the impact of a collision while guaranteeing the capacity of a luggage compartment of a rear part of a vehicle body.

Means for Solving the Problems

In order to attain the above object, according to a first aspect of the present invention, there is provided a hybrid vehicle in which a case for housing an electrical component including at least a battery module is disposed underneath a floor of a luggage compartment interposed between left and right rear side frames immediately to the rear of a fuel tank disposed beneath a floor panel, and a canister is disposed on one side of left and right sides of the case, the canister being disposed further inside than the outer end of the rear side frame in the left-and-right direction and further forward than the rear end of the case.

According to a second aspect of the present invention, in addition to the first aspect, the hybrid vehicle comprises an air filter for filtering air that is to be introduced into the canister, the air filter being provided to the rear of the canister, and the air filter being disposed outside the rearward projection range of the canister.

According to a third aspect of the present invention, in addition to the second aspect, the rear end of the air filter is disposed further rearward than the rear end of the case.

According to a fourth aspect of the present invention, in addition to the first or second aspects, the hybrid vehicle comprises a silencer on the other side in the left-and-right direction of the case, the rear end of the silencer being disposed further rearward than the rear end of the case.

According to a fifth aspect of the present invention, in addition to the first or second aspects, the hybrid vehicle comprises a silencer to the rear of the case, the silencer being disposed within the rearward projection range of the case.

According to a sixth aspect of the present invention, in addition to the first or second aspects, the electrical component includes the battery module disposed in a lower part of the case and an inverter disposed in an upper part of the case, and an intermediate duct for guiding cooling air from the battery module to the inverter is disposed in a rear part of the case.

According to a seventh aspect of the present invention, in addition to the sixth aspect, the rear end of the canister is disposed further forward than the front end of the intermediate duct.

According to an eighth aspect of the present invention, in addition to the first or second aspects, the case is hangingly supported on the left and right rear side frames via a hanger frame, and the electrical component and the canister are disposed further forward than the rear end of the hanger frame.

According to a ninth aspect of the present invention, in addition to the first or second aspects, the hybrid vehicle comprises a reinforcing frame having opposite left and right ends connected to the left and right rear side frames, the reinforcing frame being disposed between the fuel tank and the case.

According to a tenth aspect of the present invention, in addition to the first or second aspects, an item-housing container is provided to the rear of the case.

According to an eleventh aspect of the present invention, in addition to the first or second aspects, a spare tire is disposed above the case, a lower face of the spare tire being at a position equal to or higher than an upper face of the fuel tank, and the rear end of the spare tire being positioned further rearward than the rear end of the case.

According to a twelfth aspect of the present invention, in addition to the eleventh aspect, a bracket is provided on an upper face of the case, the bracket being separated therefrom by an impact, and the spare tire being supported by the bracket.

According to a thirteenth aspect of the present invention, in addition to the eleventh aspect, the hybrid vehicle comprises a rear seat disposed above the fuel tank so as to sandwich the floor panel there between, an intake duct for introducing cooling air into the case, and an exhaust duct for discharging cooling air from the case, connecting parts of the intake duct and the exhaust duct connected to the case being disposed between a front part of the spare tire and a seat cushion of the rear seat.

According to a fourteenth aspect of the present invention, in addition to the thirteenth aspect, a cross member providing a connection between the left and right rear side frames is disposed between the seat cushion of the rear seat and the connecting parts of the intake duct and the exhaust duct connected to the case.

According to a fifteenth aspect of the present invention, there is provided a hybrid vehicle in which a ease for housing an electrical component including at least a battery module is disposed underneath a floor of a luggage compartment interposed between left and right rear side frames immediately to the rear of a fuel tank disposed beneath a floor panel, and a canister is disposed on one of left and right sides of the case, wherein the canister is disposed further inside than the outer end of the rear side frame in the left-and-right direction and further forward than the rear end of the case, an air filter for filtering air that is to be introduced into the canister being disposed outside the rearward projection range of the canister, the electrical component including the battery module disposed in a lower part of the case and an inverter disposed in an upper part of the case, an intermediate duct for guiding cooling air from the battery module to the inverter being disposed in a rear part of the case, and the rear end of the canister being disposed further forward than the front end of the intermediate duct.

According to sixteenth aspect of the present invention, there is provided a hybrid vehicle in which a case for housing an electrical component including at least a battery module is disposed underneath a floor of a luggage compartment interposed between left and right rear side frames immediately to the rear of a fuel tank disposed beneath a floor panel, and a canister is disposed on one of left and right sides of the case, wherein the canister is disposed further inside than the outer end of the rear side frame in the left-and-right direction and further forward than the rear end of the case, a spare tire being disposed above the case, a lower face of the spare tire being at a position equal to or higher than an upper face of the fuel tank, and the rear end of the spare tire being positioned further rearward than the rear end of the case, the hybrid vehicle further comprising a rear seat disposed above the fuel tank so as to sandwich the floor panel therebetween, an intake duct for introducing cooling air into the case, and an exhaust duct for discharging cooling air from the case, connecting parts of the intake duct and the exhaust duct connected to the case being disposed between a front part of the spare tire and a seat cushion of the rear seat, and a cross member providing a connection between the left and right rear side frames being disposed between the connecting parts and the seat cushion of the rear seat.

A waterproof case 14 of an embodiment corresponds to the case of the present invention.

Effects of the Invention

In accordance with the arrangement of a first aspect of the invention, when the case for housing an electrical component including at least a battery module is disposed underneath a floor of a luggage compartment interposed between left and right rear side frames immediately to the rear of a fuel tank disposed beneath a floor panel of a hybrid vehicle, and the canister is disposed on one of left and right sides of the case, since the canister is disposed further inside than the outer end in the left-and-right direction of the rear side frame and further forward than the rear end of the case, when the vehicle is involved in a collision from the side the case and the canister can be protected by the rear side frame, and when the vehicle is involved in a collision from the rear the canister and the fuel tank can be protected by the case.

Furthermore, in accordance with the arrangement of a second aspect which includes the first aspect, since the air filter for filtering air introduced into the canister is disposed outside the rearward projection range of the canister, even if the vehicle is involved in a collision from the rear and the air filter moves forward, it is possible to prevent the air filter from damaging the canister.

Moreover, in accordance with the arrangement of a third aspect which includes the first and second aspects, since the rear end of the air filter is disposed further rearward than the rear end of the case, the air filter can absorb the impact of a collision, thus alleviating damage to the case.

Furthermore, in accordance with the arrangement of a fourth aspect which includes the first and second aspects, since the rear end of the silencer provided on said other side in the left-and-right direction of the case is disposed further rearward than the rear end of the case, the impact of a collision can be absorbed by the silencer, thus alleviating damage to the case.

Moreover, in accordance with the arrangement of a fifth aspect which includes the first and second aspects, since the silencer provided to the rear of the case is disposed within the rearward projection range of the case, when the vehicle is involved in a collision from the rear the impact can be absorbed by collapse of the silencer, thus protecting the case.

Furthermore, in accordance with the arrangement of a sixth aspect which includes the first and second aspects, since the electrical component includes the battery module disposed in a lower part of the case, and the inverter disposed in an upper part of the case, and the intermediate duct for guiding cooling air to the inverter from the battery module is disposed in a rear part of the case, when the vehicle is involved in a collision from the rear the impact can be absorbed by collapse of the intermediate duct, thus protecting the electrical component.

Moreover, in accordance with the arrangement of a seventh aspect which includes the sixth aspect, since the rear end of the canister is disposed further forward than the front end of the intermediate duct, when the vehicle is involved in a collision from the rear the impact can be absorbed by collapse of the intermediate duct, thus protecting the canister.

Furthermore, in accordance with the arrangement of a eighth aspect which includes the first and second aspects, since the case is hangingly supported on the left and right rear side frames via the hanger frame, and the electrical component and the canister are disposed further forward than the rear end of the hanger frame, when the vehicle is involved in a collision from the rear the electrical component and the canister can be protected by the hanger frame.

Moreover, in accordance with the arrangement of a ninth aspect which includes the first and second aspects, since the reinforcing frame having opposite left and right ends connected to the left and right rear side frames is provided between the fuel tank and the case, when the vehicle is involved in a collision from the rear the fuel tank can be protected by the reinforcing frame.

Furthermore, in accordance with the arrangement of a tenth aspect which includes the first and second aspects, since the item-housing container is provided to the rear of the case, when the vehicle is involved in a collision from the rear the case can be protected by the item-housing container as a crushable zone.

Moreover, in accordance with the arrangement of a eleventh aspect which includes the first and second aspects, since the spare tire is disposed above the case, the lower face of the spare tire is at the same height as or higher than the upper face of the fuel tank, and the rear end of the spare tire is further rearward than the rear end of the case, when the vehicle is involved in a collision from the rear the case can be protected by the spare tire, and the spare tire, which moves forward due to the impact of the collision, can be prevented from damaging the fuel tank.

Furthermore, in accordance with the arrangement of a twelveth aspect which includes the eleventh aspect, since the bracket that is separated by a collision is provided on the upper face of the case and the spare tire is supported on the bracket, when the vehicle is involved in a collision from the rear and the spare tire suffers an impact, the bracket separates from the case, thus preventing the case from being damaged.

Moreover, in accordance with the arrangement of a thirteenth aspect which includes the eleventh aspect, since the rear seat, the intake duct for introducing cooling air into the case, and the exhaust duct for discharging cooling air from the case are disposed above the fuel tank, the rear seat and the fuel tank sandwiching the floor panel, and the connecting parts of the intake duct and exhaust duct connected to the case are disposed between the front part of the spare tire and the seat cushion of the rear seat, when the vehicle is involved in a collision from the rear and the spare tire moves forward, the impact of the collision can be absorbed by the intake duct and the exhaust duct, thereby preventing the seat cushion from being damaged.

Furthermore, in accordance with the arrangement of a fourteenth aspect which includes the thirteenth aspect, since the cross member for providing a connection between the left and right rear side frames is disposed between the seat cushion of the rear seat and the connecting parts of the intake duct and exhaust duct connected to the case, the cross member can prevent the impact of a collision from being transmitted to the seat cushion.

Moreover, in accordance with the arrangement of a fifteenth aspect, when the case for housing an electrical component including at least a battery module is disposed underneath a floor of a luggage compartment interposed between left and right rear side frames immediately to the rear of a fuel tank disposed beneath a floor panel of a hybrid vehicle, and the canister is disposed on one of left and right sides of the case, since the canister is disposed further inside than the outer end in the left-and-right direction of the rear side frame and further forward than the rear end of the case, when the vehicle is involved in a collision from the side the case and the canister can be protected by the rear side frame, and when the vehicle is involved in a collision from the rear the canister and the fuel tank can be protected by the case. Moreover, since the air filter for filtering air introduced into the canister is disposed outside the rearward projection range of the canister, even if the vehicle is involved in a collision from the rear and the air filter moves forward, the air filter can be prevented from damaging the canister. Furthermore, since the electrical component includes the battery module disposed in a lower part of the case and the inverter disposed in an upper part of the case, and the intermediate duct for guiding cooling air from the battery module to the inverter is disposed in a rear part of the case, when the vehicle is involved in a collision from the rear, not only can the impact be absorbed by collapse of the intermediate duct, thus protecting the electrical component, but also since the rear end of the canister is disposed further forward than the front end of the intermediate duct, when the vehicle is involved in a collision from the rear the impact can be absorbed by collapse of the intermediate duct, thus protecting the canister.

Furthermore, in accordance with the arrangement of a sixteenth aspect, when the case for housing an electrical component including at least a battery module is disposed underneath a floor of a luggage compartment interposed between left and right rear side frames immediately to the rear of a fuel tank disposed beneath a floor panel of a hybrid vehicle, and the canister is disposed on one of left and right sides of the case, since the canister is disposed further inside than the outer end in the left-and-right direction of the rear side frame and further forward than the rear end of the case, when the vehicle is involved in a collision from the side the case and the canister can be protected by the rear side frame, and when the vehicle is involved in a collision from the rear the canister and the fuel tank can be protected by the case. Furthermore, since the spare tire is disposed above the case, the lower face of the spare tire is at the same height as or higher than the upper face of the fuel tank, and the rear end of the spare tire is further rearward than the rear end of the case, when the vehicle is involved in a collision from the rear the case can be protected by the spare tire, and the spare tire, which moves forward due to the impact of the collision, can be prevented from damaging the fuel tank. Moreover, since the rear seat, the intake duct for introducing cooling air into the case, and the exhaust duct for discharging cooling air from the case are disposed above the fuel tank, the rear seat and the fuel tank sandwiching the floor panel, and the connecting parts of the intake duct and exhaust duct connected to the case are disposed between the front part of the spare tire and the seat cushion of the rear seat, when the vehicle is involved in a collision from the rear and the spare tire moves forward, the impact of the collision can be absorbed by the intake duct and the exhaust duct, thereby preventing the seat cushion from being damaged and, furthermore, since the cross member for providing a connection between the left and right rear side frames is disposed between the seat cushion of the rear seat and the connecting parts of the intake duct and exhaust duct connected to the case, the cross member can prevent the impact of a collision from being transmitted to the seat cushion.

EXPLANATION OF REFERENCE NUMERALS AND SYMBOLS

Figure 1:
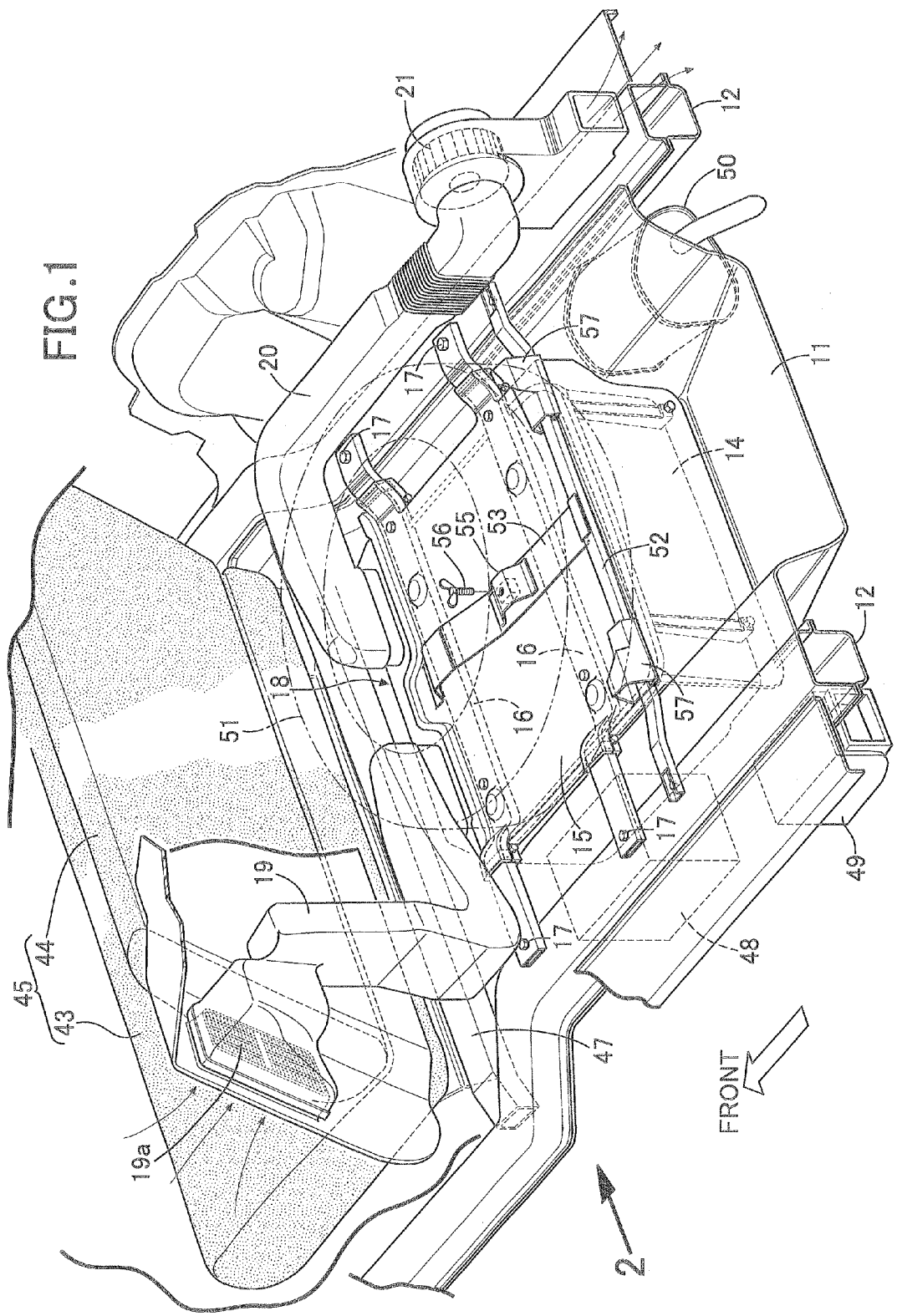
FIG. 1 is an overall perspective view of a vehicular power supply system related to a first embodiment. (first embodiment)
Figure 2:
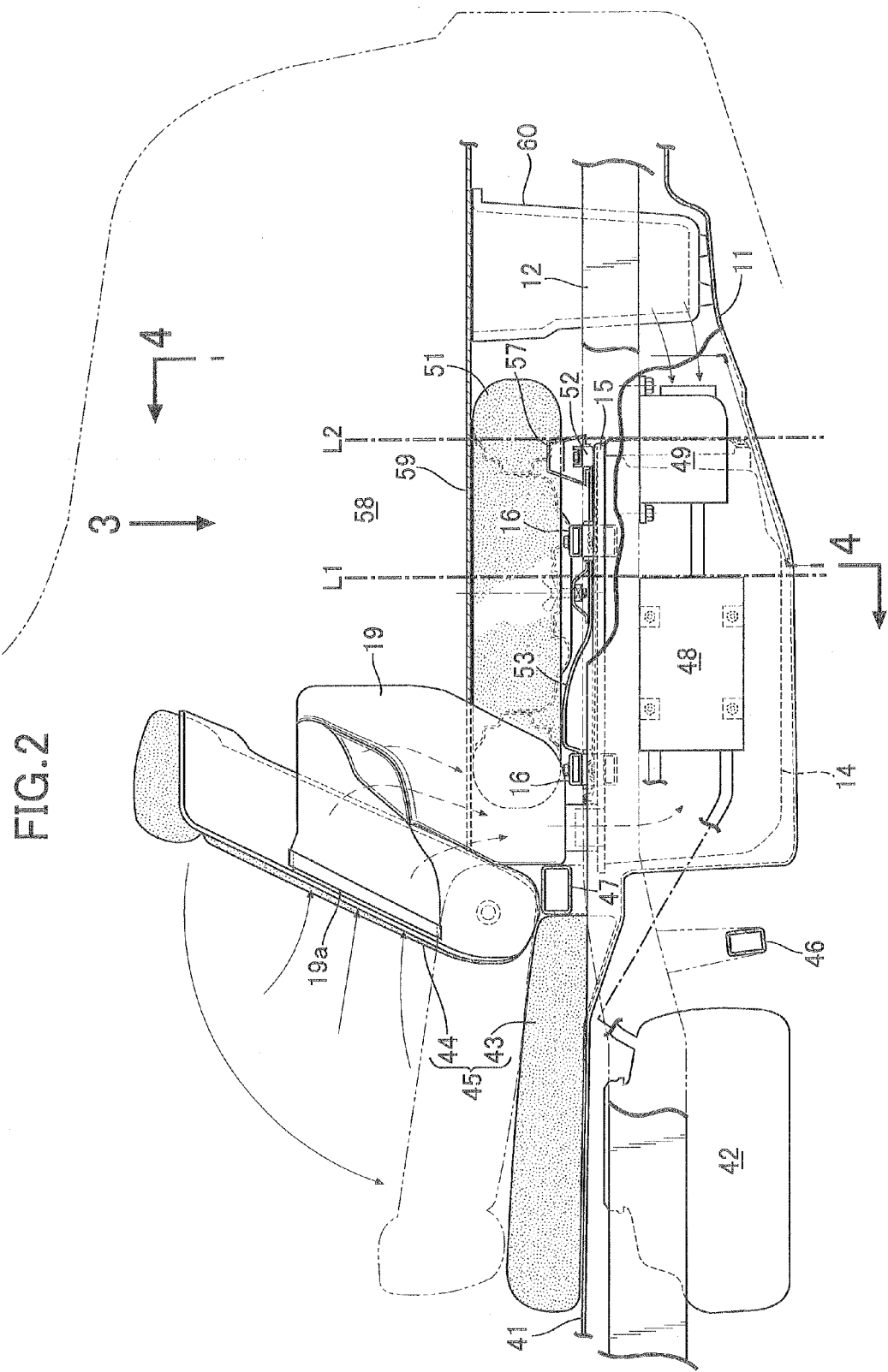
FIG. 2 is a view from arrow 2 in FIG. 1. (first embodiment)
Figure 3:
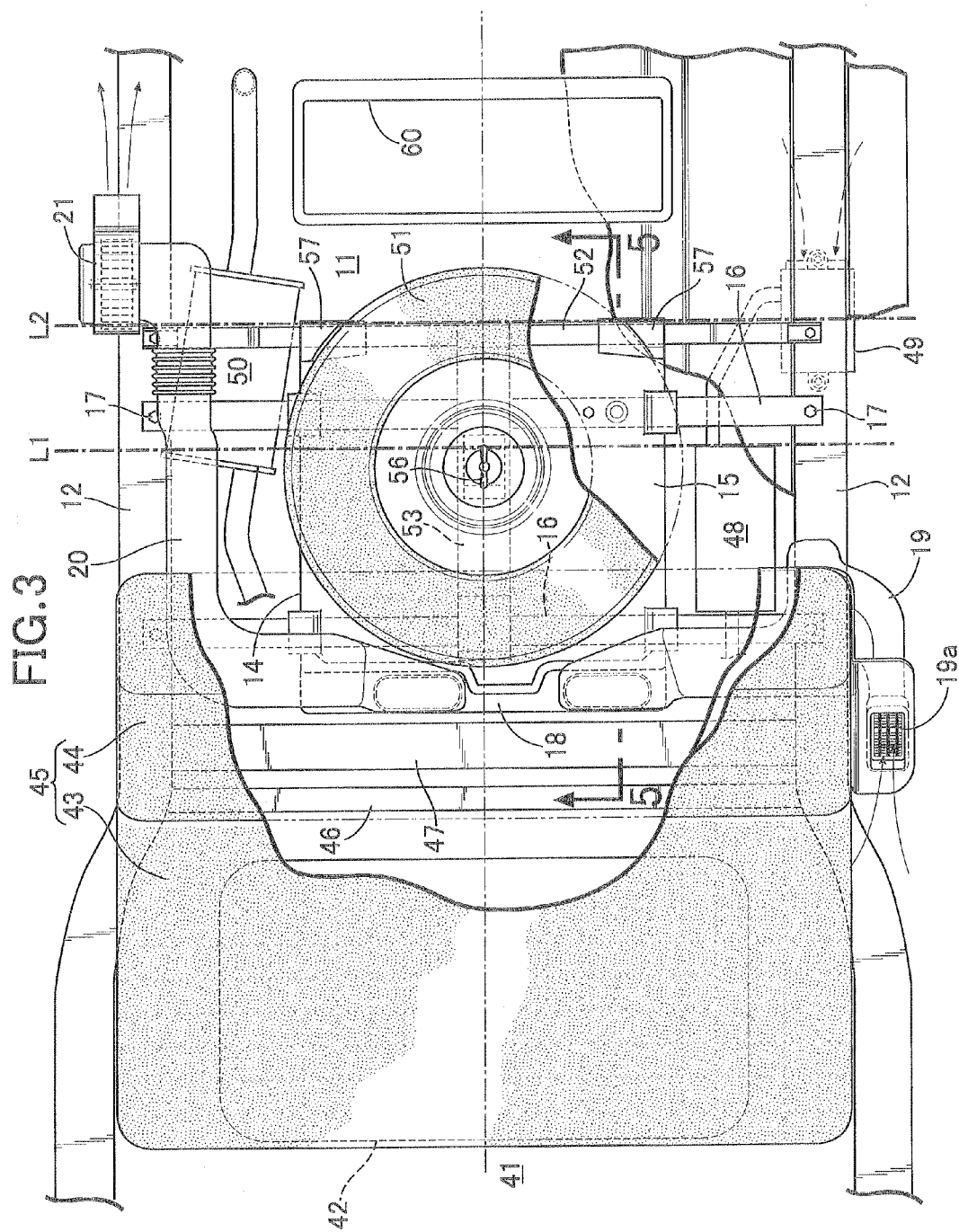
FIG. 3 is a view from arrow 3 in FIG. 2. (first embodiment)
Figure 4:
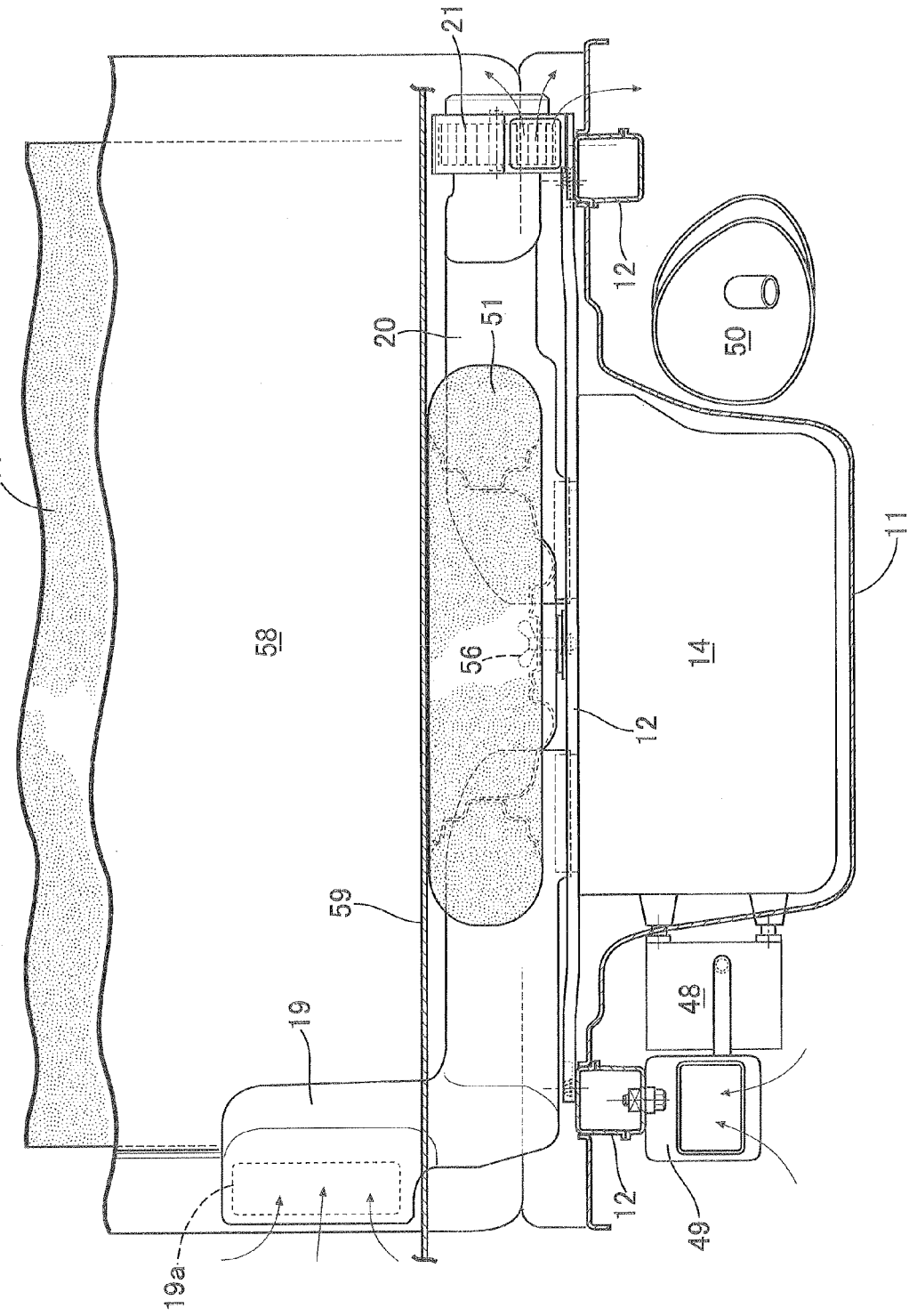
FIG. 4 is a sectional view along line 4-4 in FIG. 2. (first embodiment)

12 Rear side frame
14 Waterproof case (case)

16 Hanger frame
18 Duct member
19 Intake duct
20 Exhaust duct
24 Battery module
33 Inverter
36 Intermediate duct
41 Floor panel
42 Fuel tank
43 Seat cushion
45 Rear seat
46 Reinforcing frame
47 Cross member
48 Canister
49 Air filter
50 Silencer
50' Silencer
51 Spare tire
53 Bracket
58 Luggage compartment
60 Item-housing container

BEST MODE FOR CARRYING OUT THE INVENTION

Modes for carrying out the present invention are explained below by reference to the attached drawings.

First Embodiment

FIG. 1 to FIG. 7 show a first embodiment of the present invention.

As shown in FIG. 1, a power supply system for operating a motor/generator of a hybrid vehicle is housed by utilizing a tire pan 11 that houses a spare tire 51 beneath a trunk compartment of a vehicle body rear part. The tire pan 11, which has a downwardly recessed container shape, has its left and right side edges connected to left and right rear side frames 12 and 12. The power supply system includes a waterproof case 14 having a container shape with an open upper face, and a flat plate-shaped lid member 15 closing the upper face opening, and opposite end parts, in the vehicle width direction, of a pair of front and rear hanger frames 16 and 16 extending in the vehicle width direction while being held between the waterproof case 14 and the lid member 15 are fixed to upper faces of the left and right rear side frames 12 and 12 by bolts 17. The power supply system is therefore hangingly supported by the left and right rear side frames 12 and 12 via the pair of front and rear hanger frames 16 and 16.

The front edge of the lid member 15 ends at the position of the front hanger frame 16, and a duct member 18 is housed within the waterproof case 14 in front of this position. Connected to an upper face of the duct member 18 are the downstream end of an intake duct 19 for taking, as cooling air, air within the vehicle compartment into the waterproof case 14, and the upstream end of an exhaust duct 20 for discharging from the interior of the waterproof case 14 cooling air that has completed cooling, the intake duct 19 extending toward the upper front left of the vehicle body from a front left part of the waterproof case 14, and the exhaust duct 20 extending rearward from a front right part of the waterproof case 14 along the right side face of the vehicle body. The downstream end of the exhaust duct 20 is provided with an electrically operated cooling fan 21, and cooling air is taken into the intake duct 19 by means of negative pressure generated by the cooling fan 21. Cooling air discharged from the intake duct 19 is discharged between an interior material of the trunk compartment and a rear fender, part thereof is returned to the interior of the vehicle compartment, and part thereof is discharged outside the vehicle.

Figure 5:
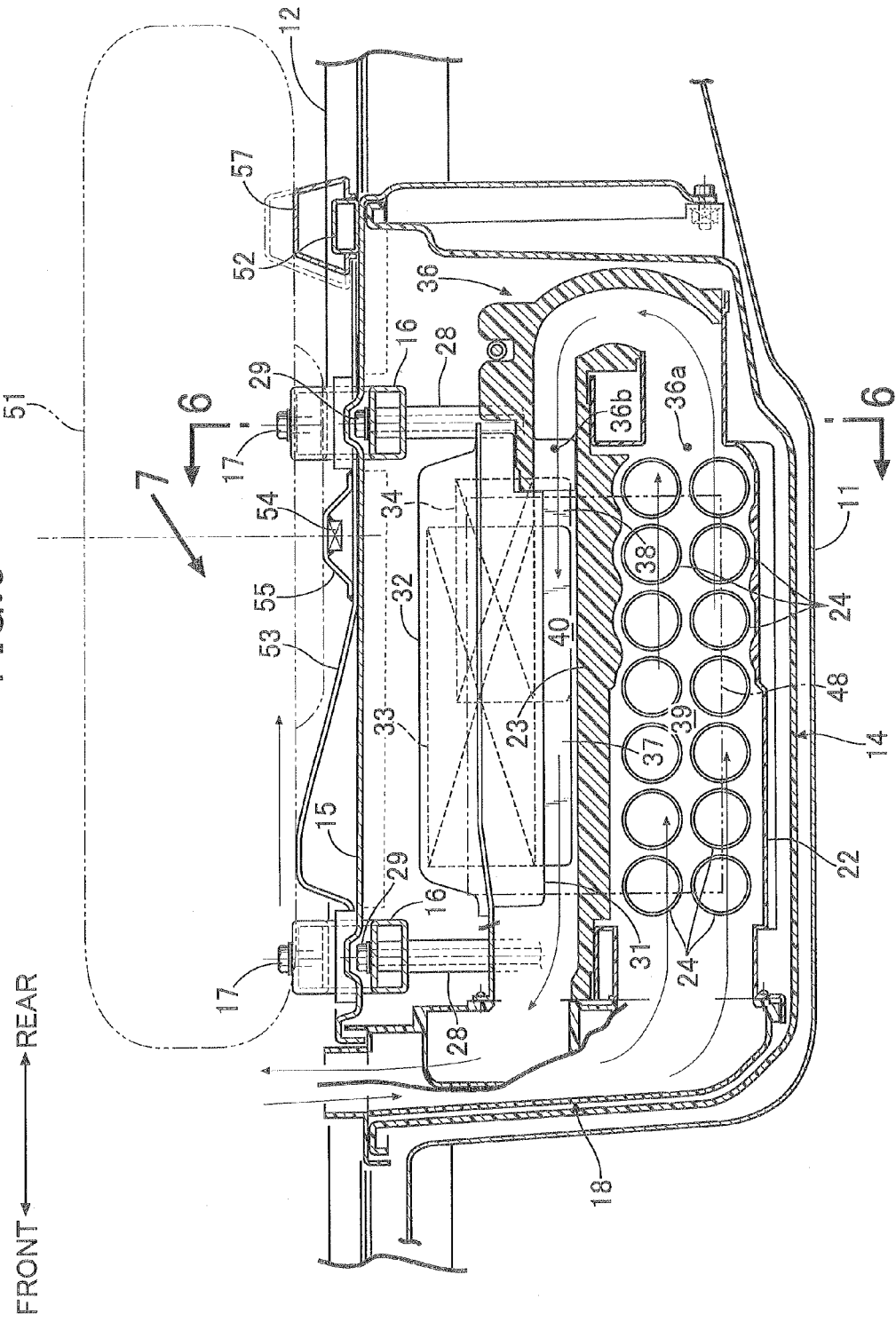
FIG. 5 is a sectional view along line 5-5 in FIG. 3. (first embodiment)
Figure 6:
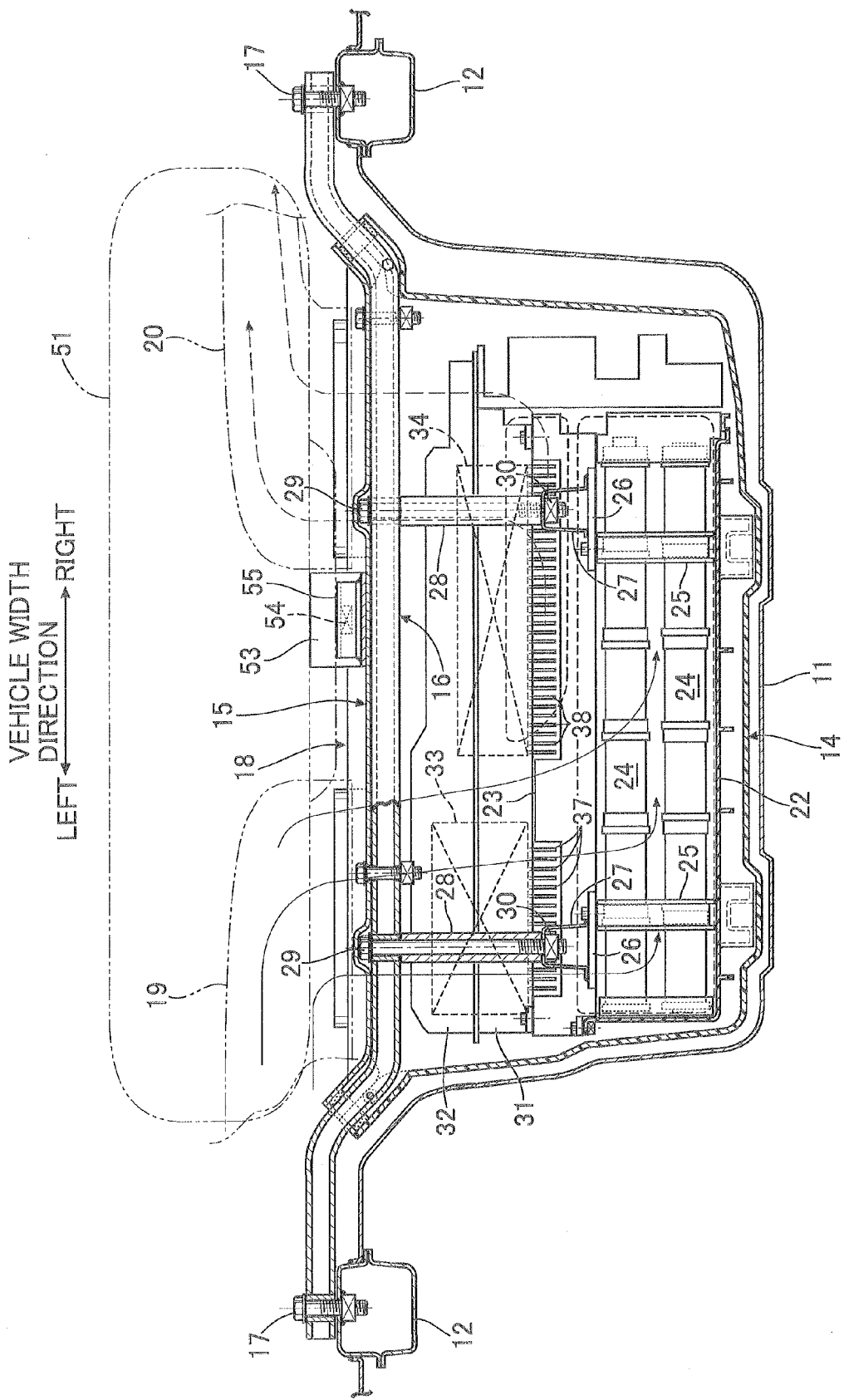
FIG. 6 is a sectional view along line 6-6 in FIG. 5. (first embodiment)
Figure 7:
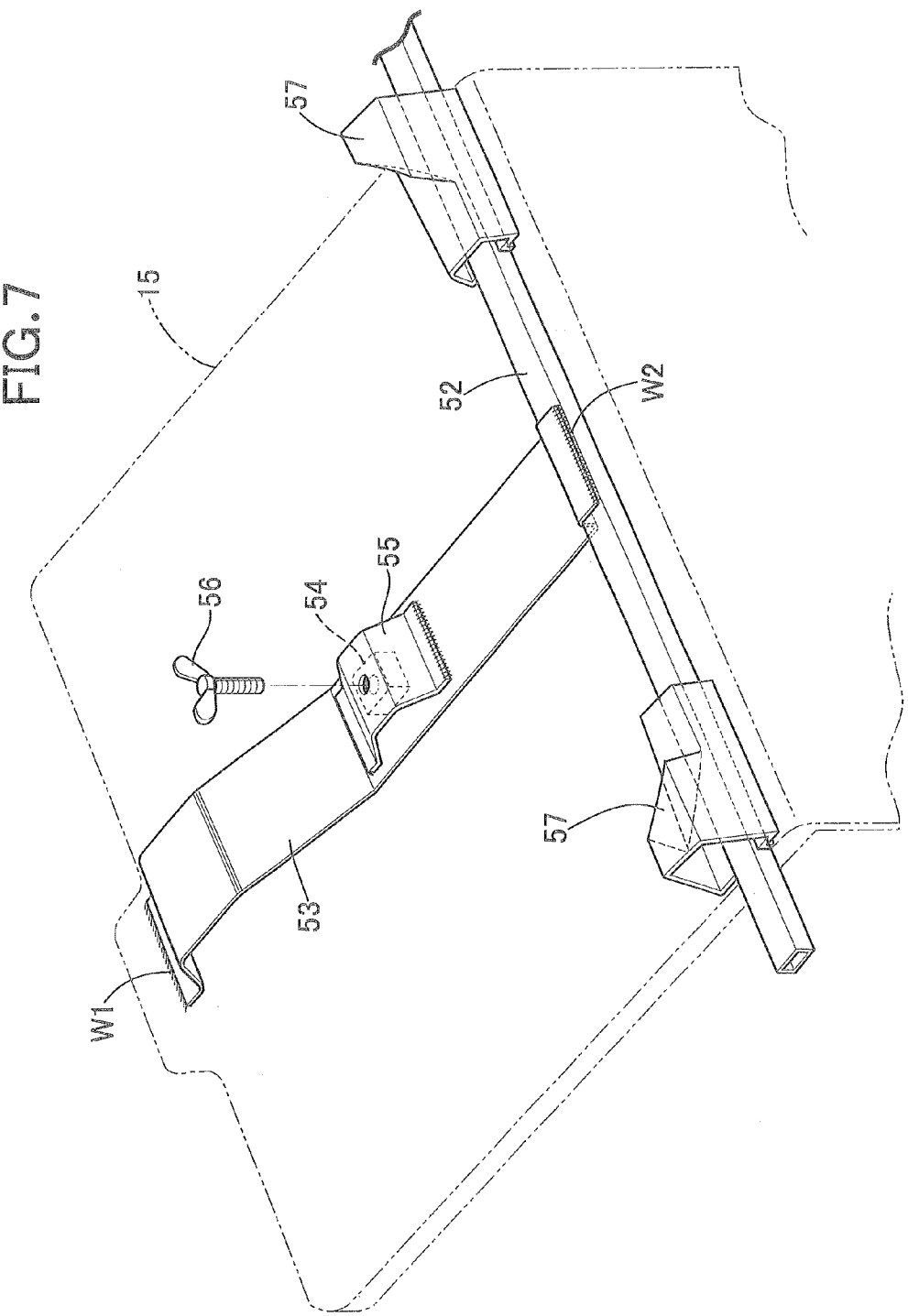
FIG. 7 is a view from arrow 7 in FIG. 5. (first embodiment)

As shown in FIG. 5 and FIG. 6, a lower battery case 22 and an upper battery case 23 forming a first cooling air passage 39 are disposed in a bottom part of the waterproof case 14 so that a space is formed therebetween. Rod-shaped battery modules 24 in which a plurality of battery cells are connected in series in the vehicle width direction are arranged so that there are 7 rows in the fore-and-aft direction and two layers in the vertical direction, and housed in the interiors of the lower battery case 22 and the upper battery case 23 in a state in which they are bundled by a pair of left and right U-shaped lower battery support frames 25 and 25 and a pair of left and right I-shaped upper battery support frames 26 and 26 joined to upper ends thereof.

A pair of left and right brackets 27 and 27 provided on upper faces of the upper battery support frames 26 are connected to the hanger frames 16 by long bolts 29 and 29 having collars 28 and 28 fitted around the outer periphery and nuts 30 and 30 screwed around lower ends thereof. A total of 14 battery modules 24 are therefore hangingly supported on the front and rear hanger frames 16 by the four bolts 29.

A lower electrical component case 31 and an upper electrical component case 32 are fixed to an upper face of the upper battery case 23, and an inverter 33 and a DC-DC converter 34, which are electrical components, are arranged in the interior thereof on the left and right in the vehicle width direction. This enables the inverter 33 and the DC-DC converter 34 to be arranged compactly.

A second cooling air passage 40 is formed between the upper face of the upper battery case 23 and a lower face of the lower electrical component case 31, and in order to guide cooling air that has cooled the battery modules 24 to the second cooling air passage 40 an intermediate duct 36, which is curved in a U-shape, is provided in a rear part of the waterproof case 14. An inlet opening 36a of the intermediate duct 36 communicates with the downstream end of the first cooling air passage 39, and an outlet opening 36b of the intermediate duct 36 communicates with the upstream end of the second cooling air passage 40. In this way, since the intermediate duct 36 is formed in a U-shape by being smoothly curved from the downstream end of the first cooling air passage 39 to the upstream end of the second cooling air passage 40, cooling air can be smoothly guided from the first cooling air passage 39 to the second cooling air passage 40.

Heatsinks 37 and 38 extending downward from the inverter 33 and the DC-DC converter 34 respectively face the second cooling air passage 40. In this way, since the heatsinks 37 and 38 extending downward from lower faces of the inverter 33 and the DC-DC converter 34 face the second cooling air passage 40, the inverter 33 and the DC-DC converter 34 can be cooled efficiently without increasing the circulation resistance of cooling air.

As shown in FIG. 1 to FIG. 4, a floor panel 41 is connected to the front of the tire pan 11, a fuel tank 42 is disposed on a lower face of the floor panel 41, and a rear seat 45 that includes a seat cushion 43 and a seat back 44 is disposed on an upper face of the floor panel 41. An intake inlet 19a at the front end of the intake duct 19 opens within a passenger compartment at the left end of the seat back 44. The height of an upper face of the waterproof case 14, that is, the lid member 15, and the height of the upper end of the fuel tank 42 are substantially equal, and a reinforcing frame 46 providing a connection between the left and right rear side frames 12 and 12 is disposed in the vehicle width direction between a front face of the waterproof case 14 and a rear face of the fuel tank 42. Furthermore, a cross member 47 providing a connection between the left and right rear side frames 12 and 12 is disposed in the vehicle width direction between the rear end of the seat cushion 43 of the rear seat 45 and connecting parts of the intake duct 19 and the exhaust duct 20 connected to the duct member 18.

A canister 48 that is temporarily charged with fuel vapor generated by the fuel tank 42 is supported on a left-hand part of the waterproof case 14, and an air filter 49 for filtering outside air that is to be taken into the canister 48 in order to purge fuel vapor charged into the canister 48 to an engine intake passage is supported on a lower face of the left rear side frame 12 to the rear of the canister 48. When viewed in the fore-and-aft direction of the vehicle body, the left end of the canister 48 is disposed further inside in the vehicle width direction than the left end of the left rear side frame 12, and the air filter 49 is disposed at a position disposed further outside in the vehicle width direction than the projection range of the canister 48 toward the rear of the vehicle body (see FIG. 4). Furthermore, when viewed in the vehicle width direction, the rear end of the canister 48 is disposed further forward than the rear end of the waterproof case 14 (see FIG. 2). Moreover, a silencer 50 for reducing exhaust noise is supported on a right-hand side part of the waterproof case 14, and the rear end of the silencer 50 is disposed further rearward than the rear end of the waterproof case 14 (see FIG. 3).

As shown in FIG. 2 to FIG. 6, the spare tire 51 is supported on an upper face of the lid member 15 of the waterproof case 14. A spare tire support frame 52 bridges between the left and right rear side frames 12 and 12 to the rear of the rear hanger frame 16, and the rear end of a bracket 53 having its front end joined via a weld W1 to an upper face of a front part of the lid member 15 is joined to the spare tire support frame 52 via a weld W2. A mounting part 55 equipped with a weld nut 54 is provided in an intermediate section in the fore-and-aft direction of the bracket 53 that floats above an upper face of the lid member 15, and the spare tire 51 is fixed to the top of the bracket 53 by means of a thumbscrew 56 screwed into the weld nut 54. In this arrangement, left and right positions of a rear part of the spare tire 51 are supported by two receiving members 57 and 57 provided on the spare tire support frame 52. A detachable base plate 59 defining a lower face of a luggage compartment 58 is disposed above the spare tire 51, and an item-housing container 60 for housing small items is disposed on a lower face of a rear part of the base plate 59. That is, the spare tire 51 and the waterproof case 14 are disposed not in the luggage compartment 58 but beneath the base plate 59 of the luggage compartment 58.

In a housed state, the rear end of the spare tire 51 projects further rearward than the rear end of the waterproof ease 14. The front end of the spare tire 51 faces the rear of the cross member 47 with the connecting parts of the intake duct 19 and exhaust duct 20 connected to the duct member 18 interposed therebetween.

The embodiment of the present invention having the above-mentioned arrangement is now explained.

When the motor/generator of the hybrid vehicle is driven, electrical components including the battery modules 24, the inverter 33, and the DC-DC converter 34 generate heat. When the cooling fan 21 is driven, due to negative pressure generated on the upstream side thereof air within the passenger compartment is taken via the intake duct 19 into the duct member 18 as cooling air. Cooling air flows into the first cooling air passage 39 of the waterproof case 14 via the duct member 18, cools the battery modules 24 while flowing from the front to the rear, then makes an upward U-turn due to the intermediate duct 36, and cools the inverter 33 and the DC-DC converter 34 by making contact with the heatsinks 37 and 38 while flowing along the second cooling air passage 40 from the rear to the front. Cooling air that has completed cooling in this way flows from the duct member 18 into the exhaust duct 20, and after passing through the cooling fan 21 it divides to the interior of the passenger compartment and the exterior of the passenger compartment and is discharged.

When the vehicle is involved in a collision from the side or from the rear, the canister 48, the battery modules 24, the inverter 33, and the DC-DC converter 34 are protected as follows. That is, as is clear from FIG. 4, when the vehicle body is viewed from the rear, since the canister 48 is disposed further inside in the vehicle width direction than the left rear side frame 12, the rear side frame can receive the impact of a side collision, thus preventing the canister 48 from being damaged. The left and right rear side frames 12 and 12 exhibit a function of protecting the battery modules 24, the inverter 33, and the DC-DC converter 34 in the interior of the waterproof case 14 disposed therebetween. Furthermore, since the rear end (see line L1 in FIG. 2 and FIG. 3) of the canister 48 when viewed from the side of the vehicle body is disposed further forward than the rear end (see line L2 in FIG. 2 and FIG. 3) of the waterproof case 14, a rear part of the waterproof case 14 can absorb the impact of a rear collision, thereby preventing the canister 48 from being damaged.

In particular, since the intermediate duct 36 within the waterproof case 14 (see FIG. 5) is disposed further rearward than the rear end of the canister 48, collision energy can be absorbed effectively by collapse of the intermediate duct 36, thus protecting the canister 48, the battery modules 24, the inverter 33, and the DC-DC converter 34, which are in front of the intermediate duct 36. Furthermore, since the canister 48, the battery modules 24, the inverter 33, and the DC-DC converter 34 are disposed, among the front and rear hanger frames 16 and 16 hangingly supporting the waterproof case 14, in front of the rear hanger frame 16, the protection thereof is still more reliable.

Moreover, since the rear end of the air filter 49 disposed on the left-hand side of the waterproof case 14 and the rear end of the silencer 50 disposed on the right-hand side project further rearward than the rear end of the waterproof case 14, the impact of a rear collision is absorbed by collapse of the air filter 49 and the silencer 50, and not only is it possible to alleviate damage to the waterproof case 14, but it is also possible to absorb the impact of a rear collision by means of the item-housing container 60 disposed to the rear of the waterproof case 24 functioning as a crushable zone. Furthermore, since the air filter 49 is disposed outside the rearward projection range of the canister 48 (see FIG. 4), even if the air filter 49 moves forward, it does not collide with the canister 48, thereby preventing the canister 48 from being damaged.

Moreover, since the spare tire 51 is supported on the upper face of the waterproof case 14, although the spare tire 51 might move forward when a rear collision occurs, since the height of the lower face of the spare tire 51 is equal to or greater than the height of the upper face of the fuel tank 42, the fuel tank 42 is not damaged by the forwardly moving spare tire 51. Moreover, since the reinforcing frame 46 is disposed in the rear part of the fuel tank 42 in the vehicle width direction, the reinforcing frame 46 can receive the impact of a rear collision, thereby yet more reliably protecting the fuel tank 42.

Furthermore, since the connecting parts of the intake duct 19 and the exhaust duct 20 connected to the duct member 18 at the front end of the waterproof case 14 are disposed between the seat cushion 43 of the rear seat 45 and the front end of the spare tire 51, even if the spare tire 51 moves forward due to the impact of a rear collision, the connecting parts of the intake duct 19 and the exhaust duct 20 collapse and absorb the impact of the forwardly moving spare tire 51, thus protecting the rear seat 45. In this arrangement, since the cross member 47 extending in the vehicle width direction is disposed to the rear of the seat cushion 43 of the rear seat 45, the rear seat 45 can be yet more reliably protected by the cross member 47.

Furthermore, since the spare tire 51 is supported by the bracket 53, which is breakably joined by the welds W1 and W2 to the upper face of the lid member 15 of the waterproof case 14, when the spare tire 51 suffers the impact of a rear collision, the bracket 53 is easily separated from the lid member 15 at the welds W1 and W2, thus preventing the waterproof case 14 connected to the lid member 15 from being damaged.

Second Embodiment

Figure 8:
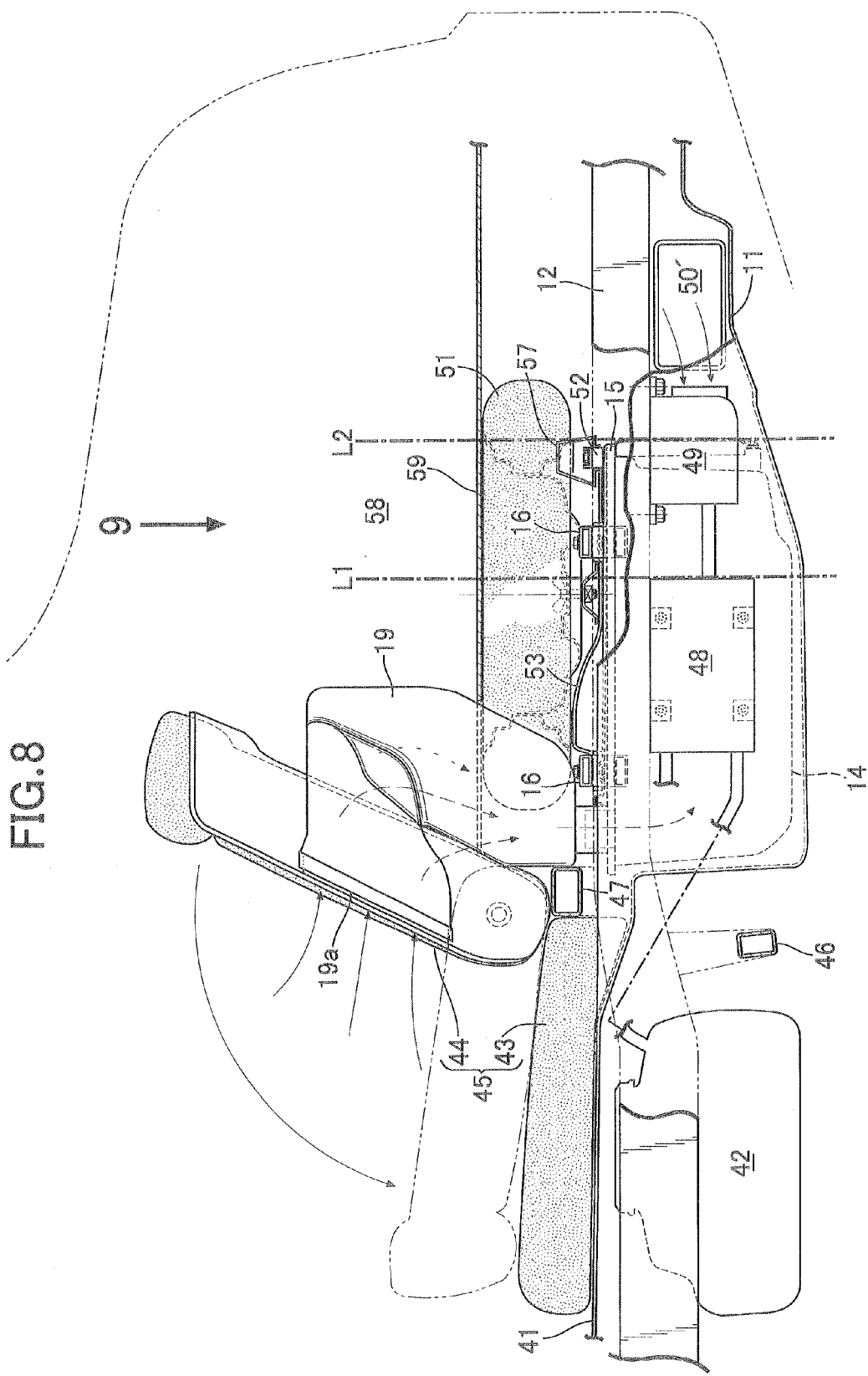
FIG. 8 is a view, corresponding to FIG. 2, related to a second embodiment. (second embodiment)
Figure 9:
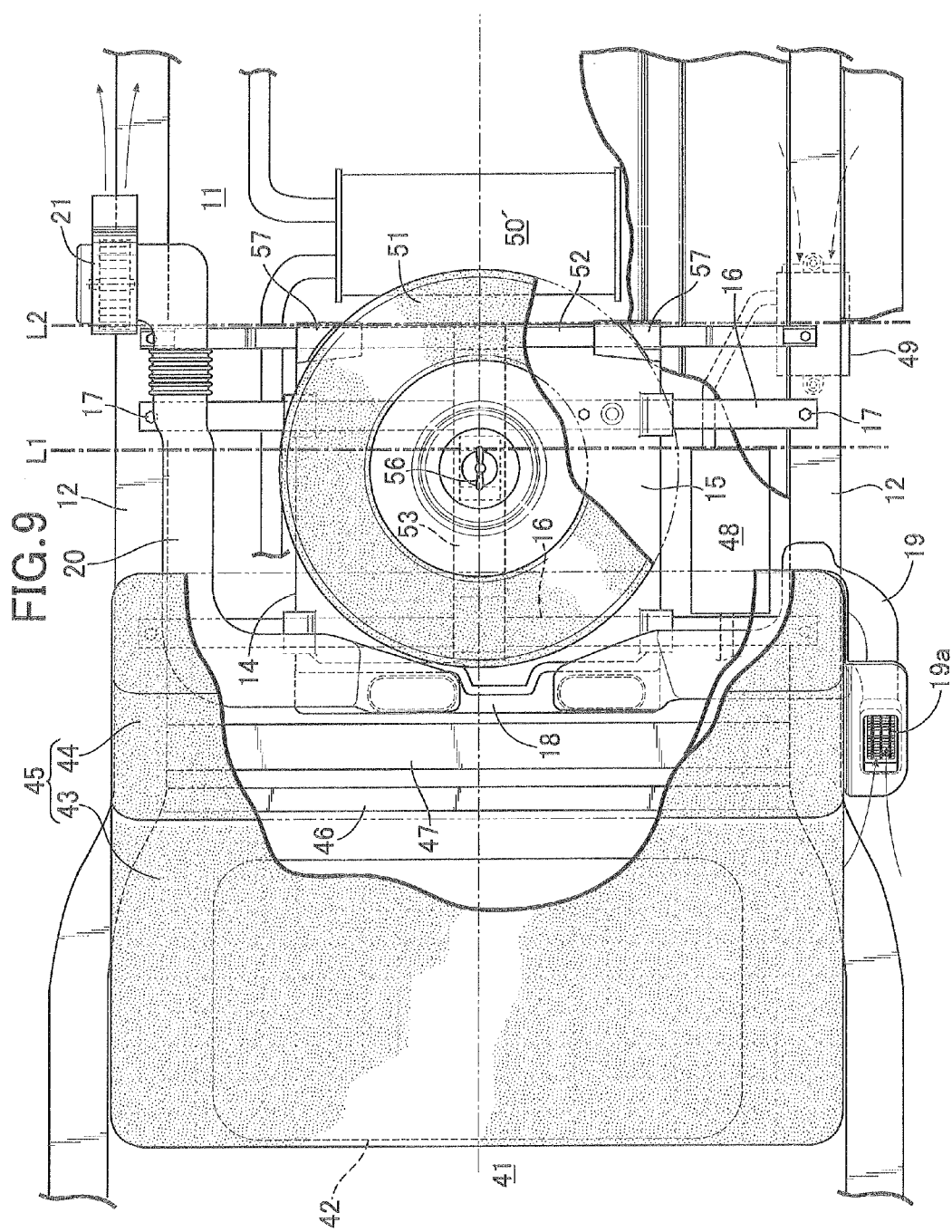
FIG. 9 is a view from arrow 9 in FIG. 8. (second embodiment)

A second embodiment of the present invention is now explained by reference to FIG. 8 and FIG. 9.

In the first embodiment, the silencer 50 is disposed on the right-hand side of the waterproof case 14, but in the second embodiment a silencer 50' is disposed to the rear of a waterproof case 14, and more specifically, within the rearward projection range of the waterproof case 14. When a vehicle is involved in a collision from the rear, the silencer 50' collapses more reliably to thereby absorb effectively the energy of the collision, thus protecting the waterproof case 14.

Third Embodiment

Figure 10:
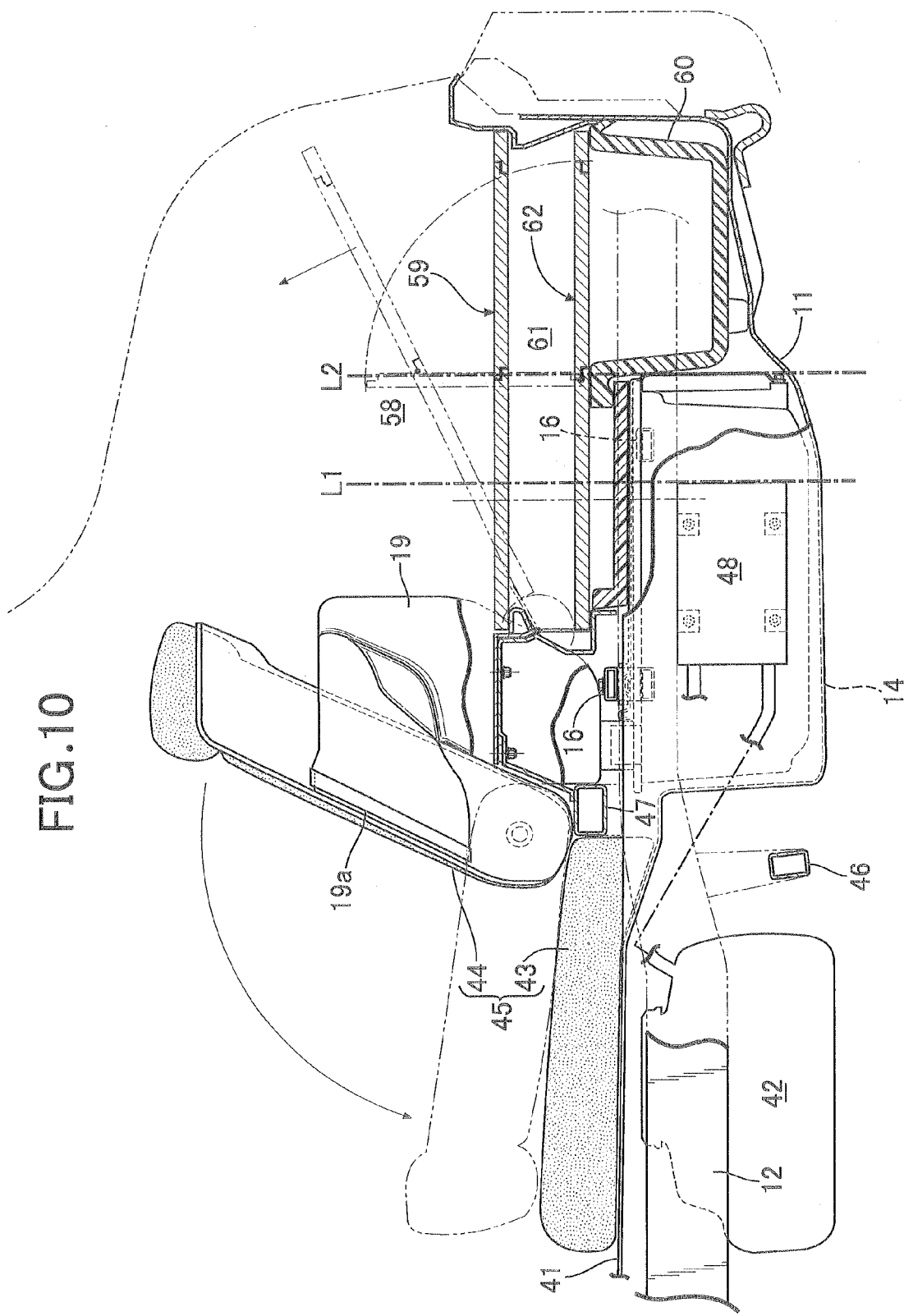
FIG. 10 is a view, corresponding to FIG. 2, related to a third embodiment. (third embodiment)

A third embodiment of the present invention is now explained by reference to FIG. 10.

In the first and second embodiments, the spare tire 51 is disposed above the waterproof case 14, but in the third embodiment a housing space of a spare tire 51 is utilized as an item-housing part 61.

That is, in the third embodiment, by shifting a base plate 59 defining a lower face of a luggage compartment 58 to a position of a base plate 62, the space of the luggage compartment 58 can be enlarged. Furthermore, by folding up the base plate 59, an item-housing container 60 can be accessed.

The arrangement of the third embodiment is otherwise the same as the arrangements of the first and second embodiments, and the same operational effects can be achieved.

Embodiments of the present invention are explained above, but the present invention is not limited to the above-mentioned embodiments and can be modified in a variety of ways as long as the modifications do not depart from the spirit and scope thereof.

For example, in the embodiments a hybrid vehicle is illustrated, but the present invention may be applied to an electric automobile.

The invention claimed is:

1. A hybrid vehicle in which a case for housing an electrical component including at least a battery module is disposed underneath a floor of a luggage compartment interposed between left and right rear side frames immediately to the rear of a fuel tank disposed beneath a floor panel, and a canister is disposed on one side of left and right sides of the case,
the canister being disposed further inside than the outer end of the rear side frame in the left-and-right direction and further forward than the rear end of the case.

2. The hybrid vehicle according to claim 1, comprising an air filter for filtering air that is to be introduced into the canister, the air filter being provided to the rear of the canister, and the air filter being disposed outside the rearward projection range of the canister.

3. The hybrid vehicle according to claim 2, wherein the rear end of the air filter is disposed further rearward than the rear end of the case.

4. The hybrid vehicle according to claim 1 or claim 2, comprising a silencer on the other side in the left-and-right direction of the case, the rear end of the silencer being disposed further rearward than the rear end of the case.

5. The hybrid vehicle according to claim 1 or claim 2, comprising a silencer to the rear of the case, the silencer being disposed within the rearward projection range of the case.

6. The hybrid vehicle according to claim 1 or claim 2, wherein the electrical component includes the battery module disposed in a lower part of the case and an inverter disposed in an upper part of the case, and an intermediate duct for guiding cooling air from the battery module to the inverter is disposed in a rear part of the case.

7. The hybrid vehicle according to claim 6, wherein the rear end of the canister is disposed further forward than the front end of the intermediate duct.

8. The hybrid vehicle according to claim 1 or claim 2, wherein the case is hangingly supported on the left and right rear side frames via a hanger frame, and the electrical component and the canister are disposed further forward than the rear end of the hanger frame.

9. The hybrid vehicle according to claim 1 or claim 2, comprising a reinforcing frame having opposite left and right ends connected to the left and right rear side frames, the reinforcing frame being disposed between the fuel tank and the case.

10. The hybrid vehicle according to claim 1 or claim 2, wherein an item-housing container is provided to the rear of the case.

11. The hybrid vehicle according to claim 1 or claim 2, wherein a spare tire is disposed above the case, a lower face of the spare tire being at a position equal to or higher than an upper face of the fuel tank, and the rear end of the spare tire being positioned further rearward than the rear end of the case.

12. The hybrid vehicle according to claim 11, wherein a bracket is provided on an upper face of the case, the bracket being separated therefrom by an impact, and the spare tire being supported by the bracket.

13. The hybrid vehicle according to claim 11, comprising a rear seat disposed above the fuel tank so as to sandwich the floor panel therebetween, an intake duct for introducing cooling air into the case, and an exhaust duct for discharging cooling air from the case, connecting parts of the intake duct and the exhaust duct connected to the case being disposed between a front part of the spare tire and a seat cushion of the rear seat.

14. The hybrid vehicle according to claim 13, wherein a cross member providing a connection between the left and right rear side frames is disposed between the seat cushion of the rear seat and the connecting parts of the intake duct and the exhaust duct connected to the case.

15. A hybrid vehicle in which a case for housing an electrical component including at least a battery module is disposed underneath a floor of a luggage compartment interposed between left and right rear side frames immediately to the rear of a fuel tank disposed beneath a floor panel, and a canister is disposed on one side of left and right sides of the case,
wherein the canister is disposed further inside than the outer end of the rear side frame in the left-and-right direction and further forward than the rear end of the case, an air filter for filtering air that is to be introduced into the canister being disposed outside the rearward projection range of the canister, the electrical component including the battery module disposed in a lower part of the case and an inverter disposed in an upper part of the case, an intermediate duct for guiding cooling air from the battery module to the inverter being disposed in a rear part of the case, and the rear end of the canister being disposed further forward than the front end of the intermediate duct.

16. A hybrid vehicle in which a case for housing an electrical component including at least a battery module is disposed underneath a floor of a luggage compartment interposed between left and right rear side frames immediately to the rear of a fuel tank disposed beneath a floor panel, and a canister is disposed on one of left and right sides of the case, wherein the canister is disposed further inside than the outer end of the rear side frame in the left-and-right direction and further forward than the rear end of the case, a spare tire being disposed above the case, a lower face of the spare tire being at a position equal to or higher than an upper face of the fuel tank, and the rear end of the spare tire being positioned further rearward than the rear end of the case, the hybrid vehicle further comprising a rear seat disposed above the fuel tank so as to sandwich the floor panel therebetween, an intake duct for introducing cooling air into the case, and an exhaust duct for discharging cooling air from the case, connecting parts of the intake duct and the exhaust duct connected to the case being disposed between a front part of the spare tire and a seat cushion of the rear seat, and a cross member providing a connection between the left and right rear side frames being disposed between the connecting parts and the seat cushion of the rear seat.

* * * * *